(12) United States Patent
Shaw

(10) Patent No.: US 12,149,944 B2
(45) Date of Patent: *Nov. 19, 2024

(54) VISUAL VOICEMAIL CENTRALIZED AUTHENTICATION SYSTEM FOR WIRELESS NETWORKS

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,508

(22) Filed: Nov. 17, 2022

(65) Prior Publication Data

US 2023/0077883 A1 Mar. 16, 2023

Related U.S. Application Data

(63) Continuation of application No. 17/021,870, filed on Sep. 15, 2020, now Pat. No. 11,546,773.

(51) Int. Cl.
*H04M 1/66* (2006.01)
*H04L 9/40* (2022.01)
*H04W 12/45* (2021.01)
*H04W 12/60* (2021.01)
*H04W 12/71* (2021.01)

(52) U.S. Cl.
CPC ............. *H04W 12/66* (2021.01); *H04L 63/18* (2013.01); *H04W 12/45* (2021.01); *H04W 12/71* (2021.01)

(58) Field of Classification Search
CPC . H04W 12/06; H04W 12/062; H04W 12/065; H04L 63/105

See application file for complete search history.

(56) References Cited

U.S. PATENT DOCUMENTS

| | | | |
|---|---|---|---|
| 7,644,088 | B2 | 1/2010 | Fawcett et al. |
| 8,005,461 | B2 | 8/2011 | Vander et al. |
| 8,064,576 | B2 | 11/2011 | Skakkebaek et al. |
| 8,155,627 | B2 * | 4/2012 | Hao ................. H04M 3/53333 455/412.2 |
| 8,260,260 | B1 | 9/2012 | Brown et al. |
| 8,428,563 | B2 | 4/2013 | Hao et al. |
| 8,548,438 | B2 | 10/2013 | Sigmund et al. |
| 8,554,208 | B2 | 10/2013 | Warsta et al. |
| 8,675,846 | B2 | 3/2014 | Sapp et al. |
| 8,688,080 | B1 | 4/2014 | Brown et al. |
| 8,705,709 | B2 | 4/2014 | Hao et al. |
| 8,781,079 | B2 | 7/2014 | Hao et al. |

(Continued)

*Primary Examiner* — Shantell L Heiber
(74) *Attorney, Agent, or Firm* — Perkins Coie LLP

(57) ABSTRACT

A method for authenticating a network entity to access restricted information. The method includes receiving a request to generate a visual voicemail message based on an analysis of network entity profile data and contextual information relating to the network entity. The method includes generating the visual voicemail message based on the network entity profile data and the contextual information, sending the visual voicemail message to the network entity and requesting authentication information included with the visual voicemail message. In response to receiving the requested authentication information, the network entity is authenticated to access to the restricted information.

13 Claims, 6 Drawing Sheets

(56) References Cited

U.S. PATENT DOCUMENTS

| | | |
|---|---|---|
| 8,798,241 B2 | 8/2014 | Sigmund et al. |
| 9,088,660 B2 | 7/2015 | Goldfarb et al. |
| 9,118,760 B2 | 8/2015 | Atef et al. |
| 9,137,667 B1 | 9/2015 | Brown et al. |
| 9,204,302 B1 | 12/2015 | Shaw et al. |
| 9,641,520 B2 | 5/2017 | Neuman et al. |
| 9,721,039 B2 | 8/2017 | Bier et al. |
| 10,270,774 B1 | 4/2019 | Berman et al. |
| 10,360,367 B1 * | 7/2019 | Mossoba ............... G06F 3/0658 |
| 10,805,799 B1 | 10/2020 | Bilger et al. |
| 2003/0228863 A1 | 12/2003 | Vander et al. |
| 2004/0023643 A1 | 2/2004 | Vander et al. |
| 2004/0128508 A1 | 7/2004 | Wheeler et al. |
| 2005/0049968 A1 | 3/2005 | Porter |
| 2005/0066061 A1 | 3/2005 | Graves et al. |
| 2005/0086079 A1 | 4/2005 | Graves et al. |
| 2005/0108262 A1 | 5/2005 | Fawcett et al. |
| 2005/0111632 A1 | 5/2005 | Caputo et al. |
| 2005/0202816 A1 | 9/2005 | Warsta et al. |
| 2007/0201626 A1 | 8/2007 | Winkler |
| 2007/0207785 A1 | 9/2007 | Chatterjee et al. |
| 2008/0025221 A1 | 1/2008 | Lipps et al. |
| 2008/0123822 A1 | 5/2008 | Sapp et al. |
| 2008/0130898 A1 | 6/2008 | Holtmanns et al. |
| 2008/0181141 A1 | 7/2008 | Khanchandani et al. |
| 2009/0061828 A1 | 3/2009 | Sigmund et al. |
| 2009/0074159 A1 | 3/2009 | Goldfarb et al. |
| 2009/0156176 A1 | 6/2009 | Hao et al. |
| 2009/0253413 A1 | 10/2009 | Sigmund et al. |
| 2010/0151831 A1 | 6/2010 | Hao et al. |
| 2010/0158211 A1 | 6/2010 | Chatterjee et al. |
| 2010/0158214 A1 | 6/2010 | Gravino et al. |
| 2010/0167700 A1 | 7/2010 | Brock et al. |
| 2010/0195807 A1 | 8/2010 | Sigmund et al. |
| 2011/0081006 A1 | 4/2011 | Hao et al. |
| 2011/0136474 A1 | 6/2011 | Ren et al. |
| 2011/0143716 A1 * | 6/2011 | Shaw ....................... H04M 1/65 455/411 |
| 2011/0143722 A1 | 6/2011 | Shaw et al. |
| 2011/0300832 A1 * | 12/2011 | Shaw ....................... G06Q 30/00 455/456.3 |
| 2011/0300833 A1 | 12/2011 | Shaw |
| 2012/0163567 A1 | 6/2012 | Hao et al. |
| 2013/0064357 A1 | 3/2013 | Hao et al. |
| 2013/0155068 A1 | 6/2013 | Bier et al. |
| 2013/0262857 A1 | 10/2013 | Neuman et al. |
| 2014/0143149 A1 * | 5/2014 | Aissi ....................... H04W 12/30 455/411 |
| 2014/0313007 A1 | 10/2014 | Harding |
| 2015/0334241 A1 | 11/2015 | Noldus |
| 2016/0380989 A1 | 12/2016 | Bailey et al. |
| 2017/0140380 A1 | 5/2017 | Tan et al. |
| 2018/0176212 A1 | 6/2018 | Nair |
| 2020/0012800 A1 * | 1/2020 | Karako ............... H04L 63/0853 |
| 2020/0366677 A1 | 11/2020 | Draznin et al. |
| 2021/0067963 A1 * | 3/2021 | Liu ....................... H04W 12/08 |
| 2021/0075631 A1 | 3/2021 | Liao |
| 2022/0021706 A1 | 1/2022 | Jubilee et al. |

* cited by examiner

VISUAL VOICEMAIL CENTRALIZED AUTHENTICATION SYSTEM FOR WIRELESS NETWORKS

CROSS-REFERENCE TO RELATED APPLICATIONS

This application is a continuation of U.S. patent application Ser. No. 17/021,870, filed on Sep. 15, 2020, entitled VISUAL VOICEMAIL CENTRALIZED AUTHENTICATION SYSTEM FOR WIRELESS NETWORKS, which is hereby incorporated by reference in its entirety.

BACKGROUND

In telecommunications, 5G is the fifth generation technology standard for cellular networks, the successor to 4G networks, which provide connectivity to most current mobile phones. Like its predecessors, 5G networks are cellular networks, in which the service area is divided into geographical areas called cells. The wireless devices in a cell are connected to internet and telephone networks by radio waves through a local antenna in the cell. A main advantage of the 5G networks is greater bandwidth, yielding higher download speeds, eventually up to 10 gigabits per second (Gbit/s). Due to the increased bandwidth, the 5G networks can also serve as general internet service providers (ISPs), competing with existing ISPs such as cable internet, and will make possible new applications in internet-of-things (IoT) and machine-to-machine (M2M) areas.

5G introduces a new era of security threats because, among other things, it enables movement and access of vastly higher volumes and types of data, and thus broadens the possibility of cyberattacks. Accordingly, the risk of data breaches or leaks of personal data can increase. For example, credentials (e.g., user IDs and passwords) readily communicated on communications networks can be stolen and used to gain access to private information available through applications and services. Victims can have their personal or private information like social security numbers, addresses, date of births, driver license numbers, and other personal data compromised.

Multi-factor authentication is a rudimentary solution in which a user is authenticated and granted access only after successfully presenting two or more factors (e.g. pieces of evidence) to an authentication mechanism. For example, in response to inputting correct credentials (first factor) for an application or service, a passcode (second factor) can be texted to the user's wireless device. The passcode can be input to the application to authenticate the user. Thus, the additional factor mitigates the risk of a breach but nevertheless lacks robustness and flexibility, which is desirable for security and authentication techniques in 5G networks.

BRIEF DESCRIPTION OF THE DRAWINGS

Embodiments of the present technology will be described and explained through the use of the accompanying drawings.

Figure 1:
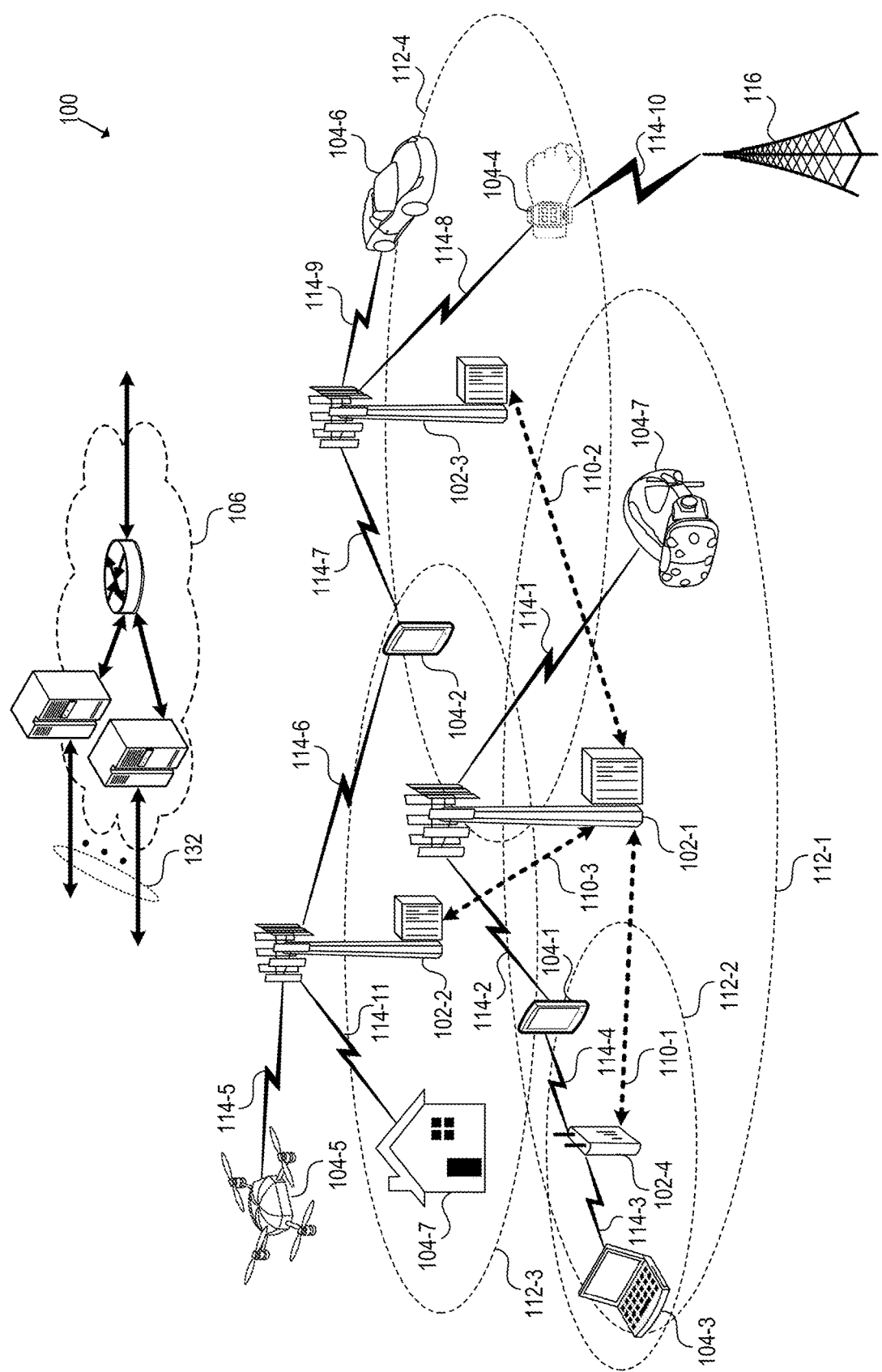
FIG. 1 is a block diagram that illustrates a wireless telecommunications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technology uses visual voicemail in authentication procedures. Visual voicemail includes direct-access to voicemail messages through a visual interface on a computing device (e.g., smartphone). Such an interface presents a list of messages for playback, as opposed to the sequential listening required using traditional voicemail, and may include the telephone number, contact name and image, date, time and duration of each message, and/or a transcript of each message. As such, visual voicemail allows a user to see who left messages and then play or read voicemail in any order. The user can choose what to listen to and which messages to delete or save, while calling or texting people back. One way to access visual voicemail is via mobile applications on mobile devices on telecommunications networks. Other features can include visual voicemail to e-mail or via SMS to mobile devices, which allows for better management of voicemail messages without clogging up the user's inbox and saves time filtering spam.

The disclosed technology can implement multi-factor authentication where a visual voicemail message includes an additional authentication factor. The authentication factor is included in the visual voicemail as content in multiple formats (e.g., audio, textual, images, video). A user is granted access to an application or service after providing credentials by presenting the authentication information embedded in the visual voicemail to the application or service, where the authentication information can be presented in multiple formats or is only effective in a particular format despite being available in the multiple formats. For example, the authentication information may only authenticate a user when input as an audio signal despite being transcribed and available for input as text.

Thus, the multi-factor authentication methods disclosed herein can confirm a user's claimed identity by using something they know (e.g., credentials) and a second factor (e.g., contents of a voicemail message) in multiple formats or only one acceptable format. The ability to receive and/or input authentication information in multiple formats based on a single message can provide an added layer of security and/or flexibility for the user to input the authentication information. Accordingly, the visual voicemail message is an example of a second factor where the user responds to a query with something that was sent to them through an out-of-band mechanism. This form of authentication factor thus adds robustness and flexibility for complex networks like 5G networks. For example, a 5G network and/or service (e.g., medical portal, social media service) can use visual voicemail for two-factor authentication and/or account recovery.

The disclosed technology can also use contextual information (e.g., location, time zone, ambient noise) associated with a network entity (e.g., user, wireless device, application) along with network entity profile data associated with the 5G network to select or generate a visual voicemail message, which is sent to a wireless device for use in an authentication process (e.g., recovery). In an example process, a communications system can receive a request to create a visual voicemail message to authenticate a user or a device (e.g., to launch an application, to access restricted content). The 5G network can collect contextual information relating to the user or the wireless device (e.g., location, time zone, ambient noise). The system can analyze the contextual information and a network entity profile associated with the user or the wireless device (e.g., stored in the unified data management (UDM) database of the 5G network) to generate a visual voicemail message to be used in the authentication process.

The 5G network can send the visual voicemail message to the user or the device and thereafter request authentication information that is included in the visual voicemail message (e.g., text, image, audio, video). After the authentication information that is received from the user or device is validated, the system grants access to the application or restricted content or services. In an additional advantage, the system can authenticate multiple parties using the same visual voicemail message (e.g., one person in a group authenticates for an entire group) or authenticate multiple parties using different layers of the same visual voicemail message. For example, each person in the group can receive a different version of the visual voicemail message or is asked about a different layer (e.g., format) in the visual voicemail message (e.g., text, image, audio).

Another aspect of the disclosed technology addresses the system and process from the device perspective rather than the network perspective. In an example process, a wireless device sends an access request to an application to participate in a restricted activity or to access restricted content. The device can then receive a visual voicemail message that includes authentication information and that is generated based on a network entity profile and contextual information associated with the wireless device. After accessing the visual voicemail message and sending the authentication information included in the visual voicemail message to a server or an application, the wireless device is granted access to participate in the restricted activity or access the restricted content, for example.

The described technology can thus safeguard private or personal information that is accessible over a wireless network infrastructure. Additional techniques are described in the assignee's related applications including U.S. patent application Ser. No. 17/021,877, filed Sep. 15, 2020, titled "Visual Voicemail as Service for Authentication or Account Recovery of Wireless Devices in a Wireless Network," U.S. patent application Ser. No. 16/945,592, filed Jul. 31, 2020, titled "Cached Entity Profiles at Network Access Nodes to Re-Authenticate Network Entities," U.S. patent application Ser. No. 16/945,637, filed Jul. 31, 2020, titled "Connectivity Scheduler for NB-IOT Devices," U.S. patent application Ser. No. 17/007,782, filed Aug. 31, 2020, titled "Wireless Network That Discovers Hotspots for Cyberattacks Based on Social Media Data," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2:
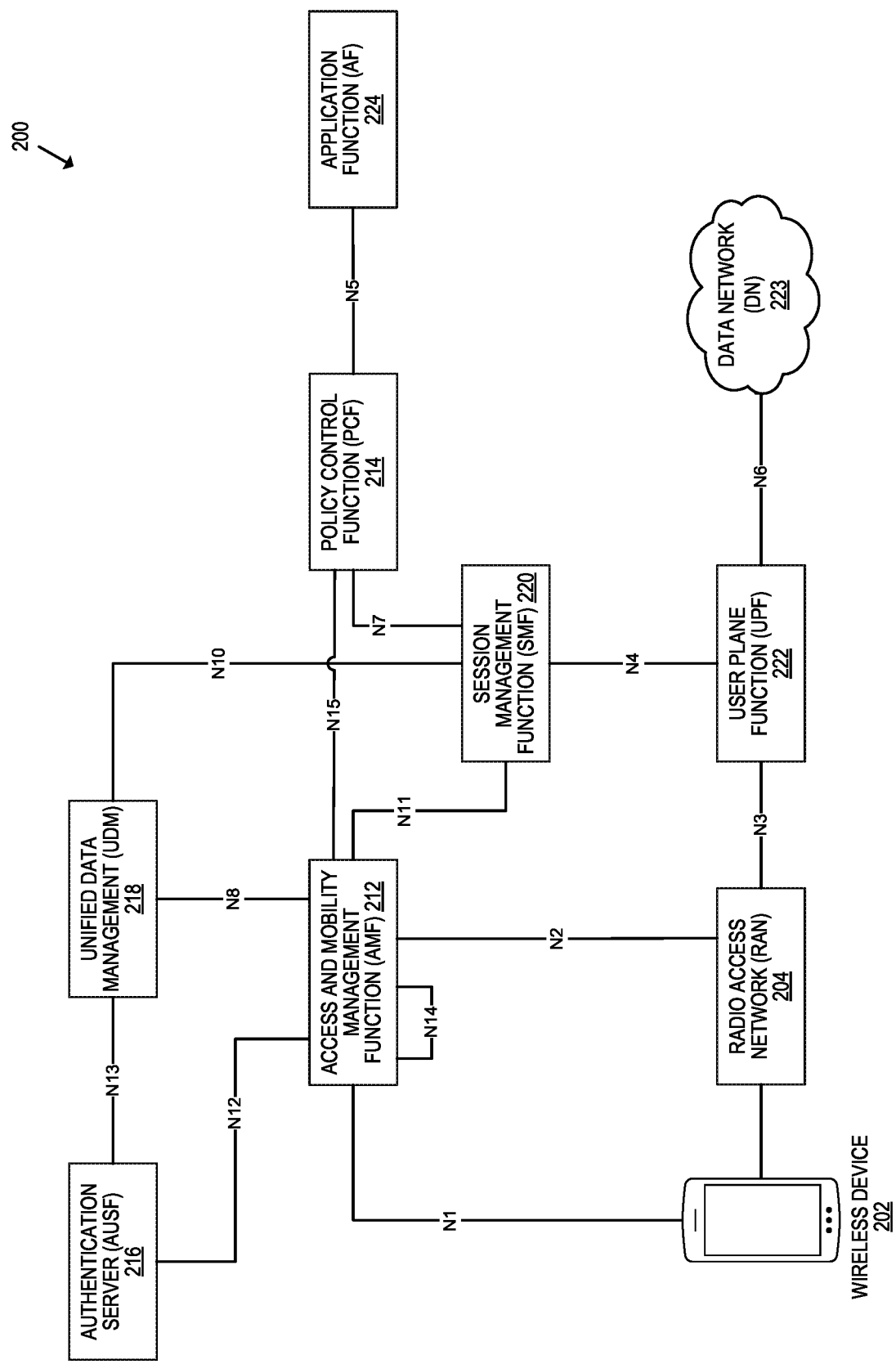
FIG. 2 is a block diagram that illustrates an architecture of network functions of a telecommunications network.

FIG. 2 is a block diagram that illustrates an architecture of network functions of a 5G network that can implement aspects of the present technology. A wireless device 202 can access the 5G network via a RAN 204, through a NAN such as a small cell. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) for storing and managing subscriber information from the frontend that processes the subscriber information. The UDM can employ UDC under 3GPP TS 22.101, which supports a layered architecture that separates user data from application logic in 3GPP systems. The UDM 218 is associated with a database (not shown) that can contain profile data for subscribers and/or other data that can be used to authenticate network entities (e.g., subscribers, wireless devices). Given the large number of wireless devices (e.g., IoT devices) that can connect to the 5G network, the UDM 218 contains a voluminous amounts of profile data that is accessed to authenticate network entities.

For example, each time that a wireless device seeks to connect to a 5G network, a UDM receives an indication of a connection request received by a NAN, and authorizes the connection request by authenticating the wireless device or subscriber based on profile data stored at the UDM. The UDM can then communicate an indication of the authorization to the NAN so that the wireless device can access the 5G network through the NAN.

Visual Voicemail System

Figure 3:
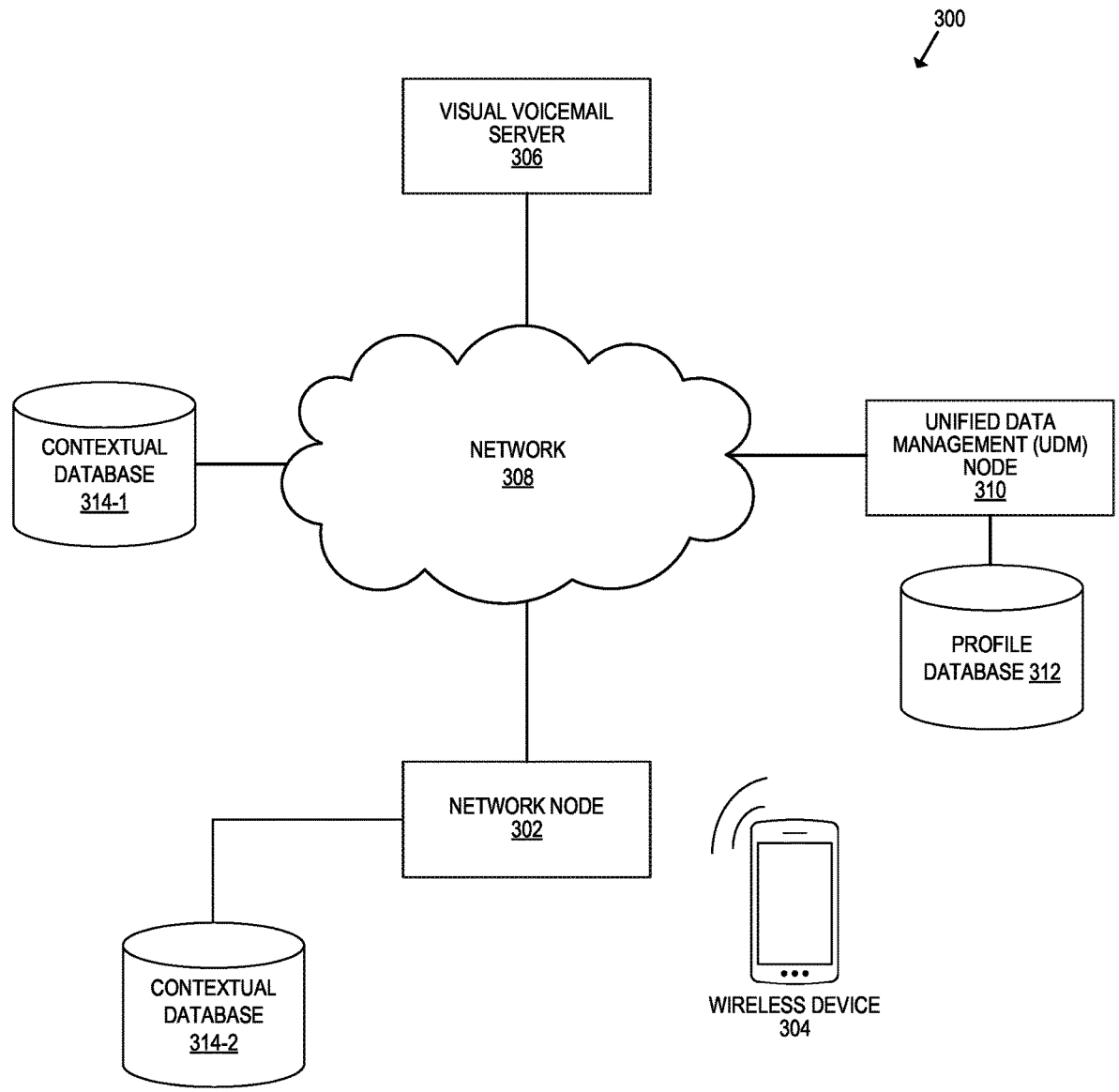
FIG. 3 is a block diagram that illustrates a system for collecting network entity profile data and contextual information used to generate authentication information.

FIG. 3 is a block diagram that illustrates a system 300 for collecting network entity profile data and contextual information used to generate authentication information that is flexible and robust. A network node 302 has a wireless range that spans an area including a wireless device 304. The network node 302 can include or be any type of network node that is coupled to a visual voicemail server 306 over a wireless network 308 (e.g., 5G network). A UDM 310, which is commonly used to authenticate a user for access to the wireless network 308, can access or include a profile database 312 that stores network entity profile data such as user, device, or application profile data.

Therefore, the profile database 312 can store data in addition to the normal profile data that is typically used to grant access by the wireless device 304 to the wireless network 308. The additional data can include user preference information such as a preferred format for the authentication information. The additional data can also include contextual data associated with network entities including the location, time zones, current status, or any other activity data associated with network entities.

The system 300 can include one or more contextual databases 314-1 or 314-2 (collectively referred to as "contextual databases 314"). The visual voicemail server 306 can access contextual information of the contextual databases 314 over the network 308. The contextual database 314-2 is collocated with the network node 302 to readily collect ongoing or changing contextual information of a network entity (e.g., wireless device 304). As such, contextual information stored at the contextual database 314-2 can be pushed to the visual voicemail server 306 or the contextual database 314-1 periodically or on demand when to generate a visual voicemail message that is customized for a network entity. Thus, the visual voicemail server 306 can obtain network entity profile data of the wireless device 304 (or an associated user or application) via the UDM 310 from the profile database 312 and obtain contextual information from the contextual database 314 to generate a custom visual voicemail message for an authentication procedure.

Techniques for Visual Voicemail Authentication

An aspect of the disclosed technology uses visual voicemail in multi-factor authentication. For example, a 5G network and/or service (e.g., medical portal, social media service) can use visual voicemail for two-factor authentication and/or account recovery. The disclosed technology can use contextual information (e.g., location, time of day, time zone, ambient noise) of a network entity along with profile information stored for 5G network authentication procedures to generate a custom visual voicemail message, which is sent to the user or wireless device for use in the authentication process. For example, in response to launching an application on a wireless device or receiving request from a user of the wireless device to access restricted content, a visual voicemail server can create a visual voicemail message to authenticate the user or the wireless device. An authentication system can analyze contextual information and network entity profile data associated with the user, wireless device, or application. The contextual information is collected by the 5G network and the network profile data can be stored at a UDM database of the 5G network.

The visual voicemail message can be customized based on the contextual information and/or the network entity profile information. As such, the visual voicemail system can provide visual voicemail messages that include different forms of authentication information to the same or different users depending on the user's context. This increases the strength of the authentication factor, improves the ease of using the authentication process, and can avoid disrupting the user's environment. For example, the authentication information embedded in a voicemail message for a user in a meeting can be constrained to audio-less factors such as text. On the other hand, the authentication information embedded in the voicemail message while the user is driving can be constrained to an audio factor that avoids distracting the user while driving.

The 5G network can send the (custom) visual voicemail message to the user or the device and thereafter request authentication information (e.g., text, image, audio, video) that is included in the visual voicemail message. After the authentication information received from the user or device is validated, the system grants access to the application or restricted content or services. In an additional advantage, the system can authenticate multiple parties using the same visual voicemail message (e.g., one person in a group authenticates for an entire group) or authenticate multiple parties using different layers of the same visual voicemail message. For example, each person in the group can receive a different version of the visual voicemail message or is asked for a different layer (e.g., format) the visual voicemail message (e.g., text, image, audio) to complete authentication for the group.

Another aspect of the disclosed technology addresses the authentication system and process from the perspective of the wireless device rather than the wireless network. For example, the wireless device can send an access request to an application to participate in a restricted activity or to access restricted content. The wireless device can then receive a visual voicemail message that includes authentication information, which is generated based on network entity profile data and contextual information of the network entity. After returning the authentication information to the authentication system, the wireless device is granted access to perform the restricted activity.

Figure 4:
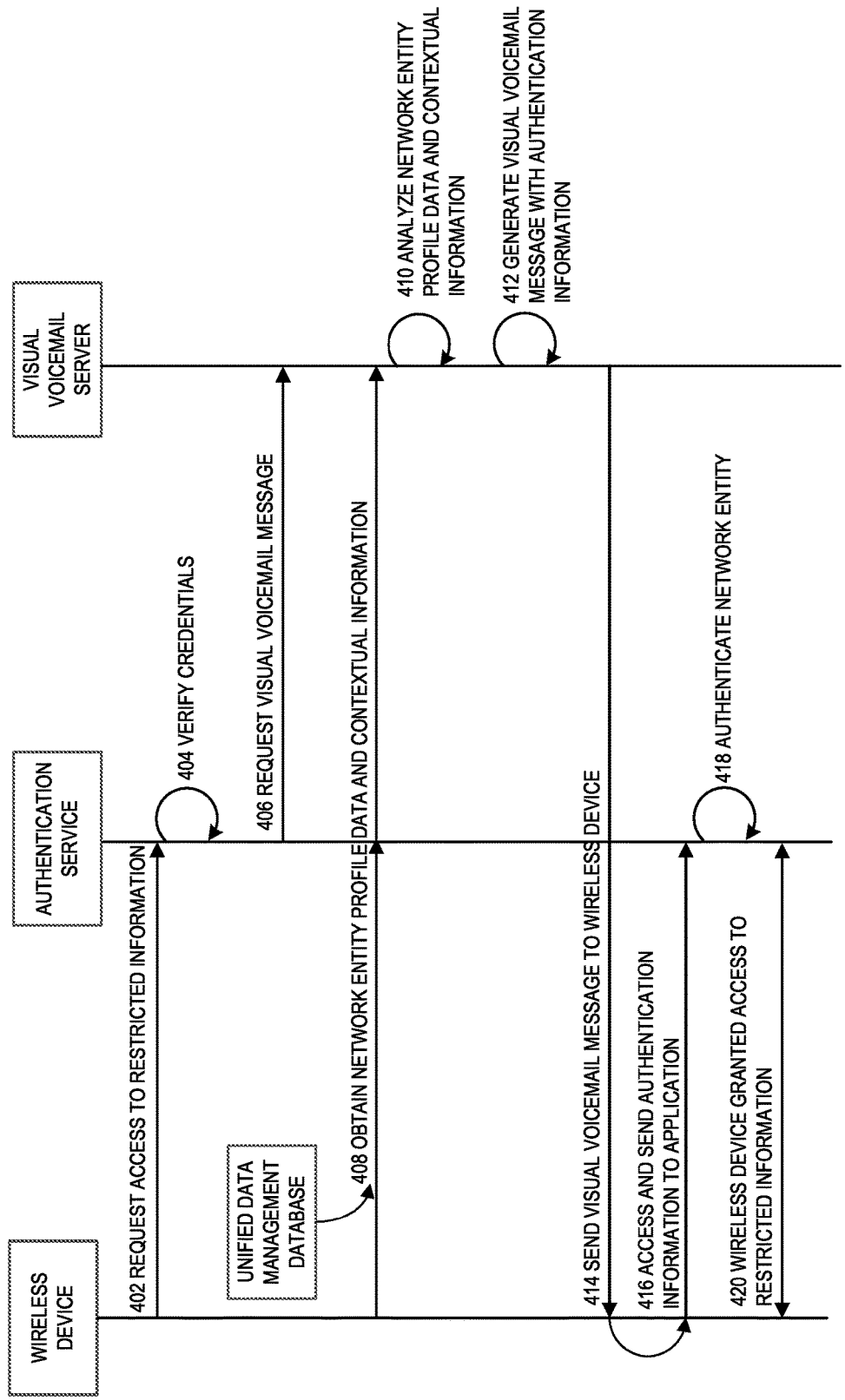
FIG. 4 is a flow diagram that illustrates a method for authenticating a network entity with a visual voicemail message.

More specifically, FIG. 4 is a flowchart that illustrates a method 400 to authenticate a network entity to participate in a restricted activity, access restricted content, or access a restricted service on a communications network. Specific examples of the network entity include a wireless device, a user associated with the wireless device, or an application associated with the wireless device. Specific examples of the wireless device include a smartphone, a vehicle communications system, a smart appliance, or any other computing device that can communicatively couple to the communications network. The method 400 includes operations performed by an authentication system including a network entity communicatively coupled to a visual voicemail server.

At 402, the wireless device launches an application or executes an action that sends a request to an authentication service. In one example, the user of a wireless device seeks to access private financial or healthcare information via an application on the wireless device. The application can require user credentials (e.g., user ID and password) from a user of the wireless device. The request includes user credentials input by the user to the wireless device. The disclosed embodiments contemplate any request to access restricted information by participating in a restricted activity, accessing restricted content, accessing a restricted service, etc.

At 404, the authentication service verifies the user's credentials. For example, the authentication service can compare the user ID and password to a database of user IDs and passwords for users that are registered to access the restricted information on the application. If the credentials are valid, the user is informed that a visual voicemail message will be sent to the user as part of a multifactor authentication procedure. Alternatively or additionally, the authentication service can form part of the wireless network, and thus once the wireless device is authenticated to access the wireless network (e.g. using the IMSI or other credentials stored in the wireless device), the network can automatically authenticate some or all subsequent access requests by the wireless device.

At 406, in response to validating the user's credentials, the authentication service sends a request for a visual voicemail server to generate a visual voicemail message that includes authentication information. For example, the authentication service can cause an Access and Mobility Management Function (AMF) of a 5G network to request a visual voicemail message from the visual voicemail server to the wireless device.

At 408, the visual voicemail server obtains network entity data and contextual information related to the wireless device, the user, or the application. The network entity profile data is obtained from the wireless network, such as from a UDM database that stores typical profile information and includes additional information about network entities. The contextual information is collected over the communications network from the wireless device periodically or on demand. For example, the authentication service can call an application programming interface (API) of the wireless device to collect environment data and location information of the wireless device. The environment data can include data indicative of an activity associated with the wireless device. Operation 408 can occur at any time during the method 400, including before the request for access to restricted information of 402. Moreover, this operation and many of the subsequent operations can be performed by the authentications service or the visual voicemail server.

At 410, the visual voicemail server can analyze the network entity profile data associated with the network entity and the collected contextual information. For example, an identifier of the user identified in the network entity data can be compared with the contextual information to identify authentication information based on activity of the user associated with the wireless device. In one example, the contextual information can include an indication that a navigation application is currently running (e.g., the wireless device is in a driving mode). As such, the contextual information can influence the generation of authentication information, which can be in a format that is suitable for driving. For example, the authentication information can be an audio message that the user can playback or verbally repeat as input to the application to access the restricted information. In another example, the contextual information includes location information. As such, the authentication information can be location-dependent thereby adding another layer of complexity for robust security.

At 412, the visual voicemail server generates the visual voicemail message based on the network entity profile data and the contextual information. The visual voicemail message can be layered with authentication information in different formats (e.g., audio, text, image, video) and customized for the network entity based on network entity profile data and contextual information. In one example, the visual voicemail server stores multiple sets of authentication information and selects one based on an analysis of the network entity profile data and the contextual information. For example, the visual voicemail server can select a stock audio message that is customized based on the name of the user and the location of the wireless device. A visual voicemail message with multiple layers of authenticating content can be constructed by selecting a combination of features or formats selected based on the network entity profile data and the contextual information. For example, the visual voicemail message can include the authentication information about user history data in multiple formats where only one format enables access to the restricted information.

At 414, the visual voicemail message is sent to the wireless device. The visual voicemail message populates a visual voicemail message application on the wireless device. The wireless device presents a request for the authentication information included with the visual voicemail message. The application can display the request with particular instructions to input a suitable format of the authentication information. The user can open the visual voicemail message to hear an audio version, view associated contact information, read a transcribed version of the audio message, etc. Hence, the application can request the user to input the authentication information in a textual form, playback the audio form, verbally repeat the message for the microphone of the wireless device, verbally or textually describe an image, etc.

At 416, the wireless device accesses the authentication information of the visual voicemail message and sends it to the authentication service via the application and over the wireless network. In one implementation, the authentication information is extracted, parsed, and returned to the visual voicemail server in a manner that is transparent to the user (e.g., automatically without user input). That is, the wireless device can extract the authentication information and automatically pass the extracted content to the application without the user needing to manually input the authentication information.

At 418, in response to receiving the authentication information, the network entity is authenticated to thereby provide the wireless device with access to participate in the restricted activity, access the restricted content, or access the restricted service on the wireless network.

At 420, the authentication service grants the wireless device access to participate in the restricted activity, the restricted content, or the restricted service. As such, the visual voicemail server can generate and send a visual voicemail message over the wireless network to authenticate access by the wireless device. And, upon being authenticated, the user can access the restricted information over the wireless network.

Figure 5:
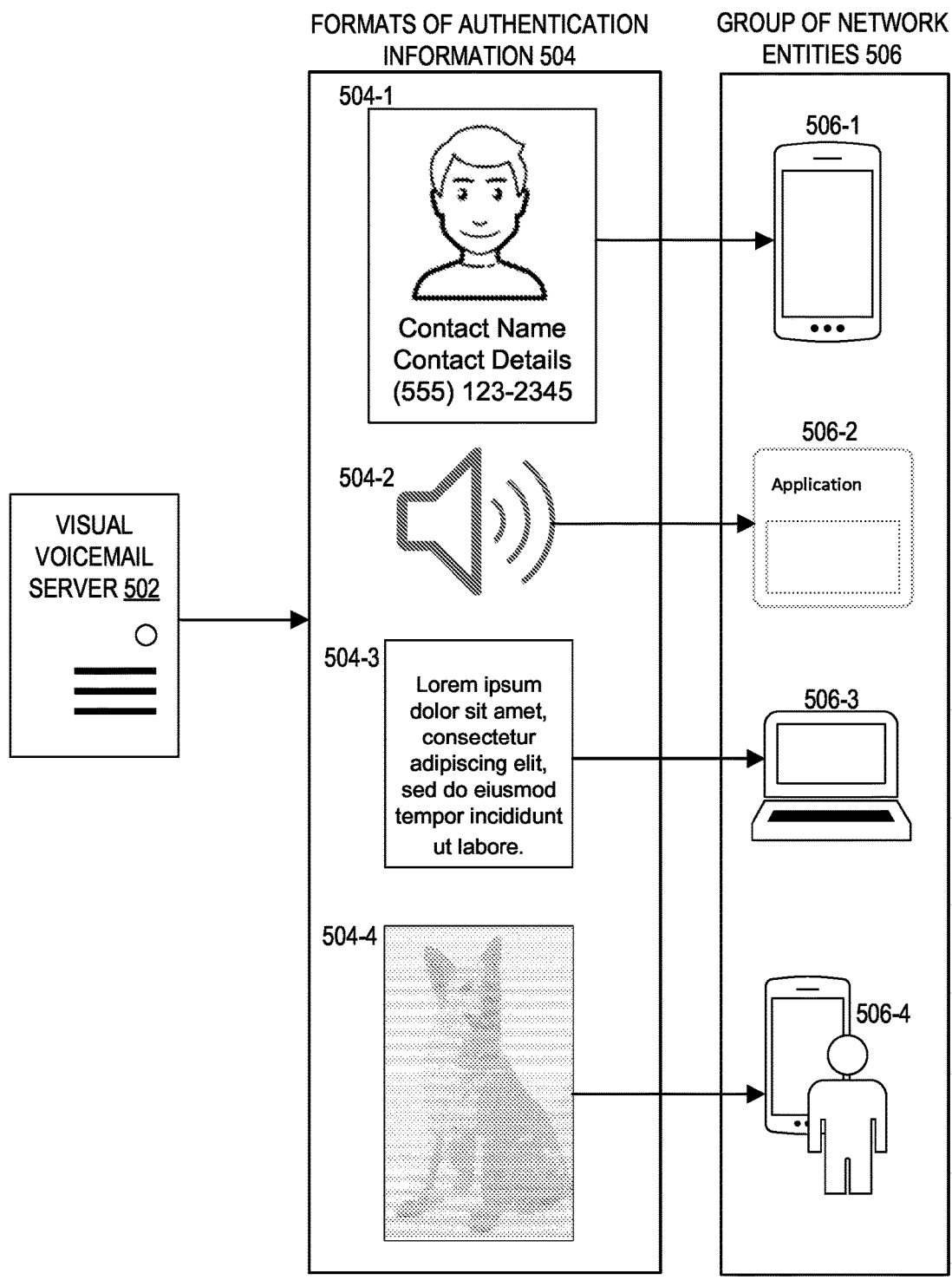
FIG. 5 is a block diagram that depicts a technique for authenticating a group of network entities with different formats of authentication information.

The disclosed technology can also authenticate groups of network entities with visual voicemail messages that include layers of authentication information, which can be in different formats for different network entities. For example, FIG. 5 is a block diagram 500 that depicts a visual voicemail message to authenticate a group of network entities. As shown, the visual voicemail server 502 can generate visual voicemail messages that include different formats of authentication information 504. The authentication information 504-1 includes contact information (e.g., profile image, name, details, phone number) associated with the visual voicemail message; the format of the authentication information 504-2 includes an audio message; the format of the authentication information 504-3 includes text (e.g., a transcribed version of an audio message); and the format of the authentication information 504-4 includes an image, which can be generated from characters of text. That is, the content of a visual voicemail message can include text that is shaped like a recognizable object such as a traffic light, animal, or building. In another example, the visual voicemail system can be modified to allow for the addition of image files (e.g., bitmap, JPEG, GIF) in content that is delivered in visual voicemail messages to users. Authentication can require that a user correctly identify the image.

The group of two or more network entities 506 (e.g., mobile phone 506-1, application 506-2, computing device 506-3, user of a computing device 506-4) can each be authenticated in response to sending authentication information back to the authentication system. Thus, the visual voicemail server 502 can generate visual voicemail messages for each network entity of the group of network entities 506. The visual voicemail messages are sent over a communications network to respective network entities. In one example, the visual voicemail messages have common authentication information in multiple formats including an audio format, a textual format, or an image format. Hence, the same authentication information can be provided in different formats for different network entities.

In one example, each of the network entities 506 receives the same visual voicemail message but is only authenticated when sent back to the authentication service in a particular format for the particular network entity. For example, a first network entity is authenticated only by providing a text format of a message while a second network entity of the same group is authenticated only by providing the same authentication information in an audio format. In an example, if any network entity of a group responds with correct authentication information, every network entity of the group is authenticated.

Suitable Computer System

Figure 6:
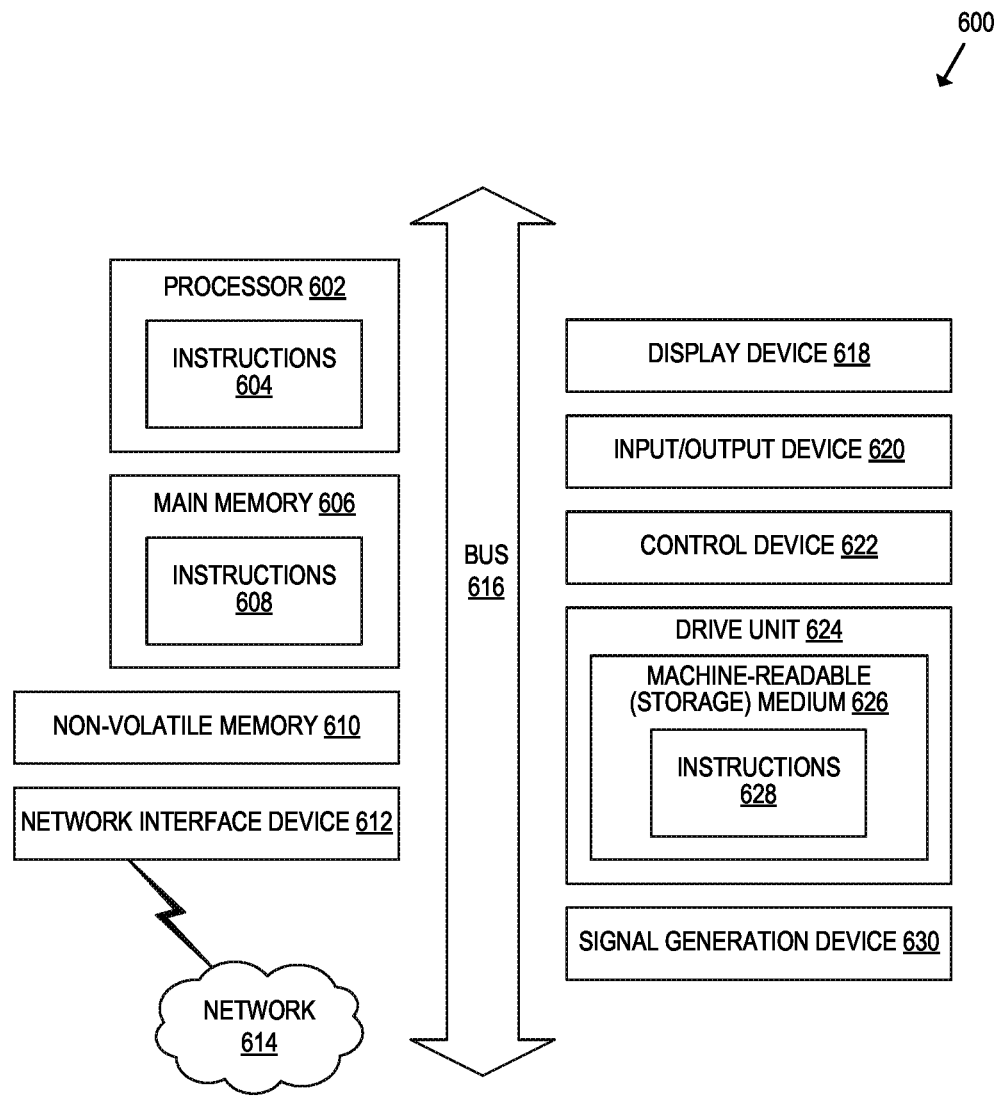
FIG. 6 is a block diagram that illustrates an example of a computing system in which at least some operations described herein can be implemented.

FIG. 6 is a block diagram that illustrates an example of a computer system 600 in which at least some operations described herein can be implemented. For example, components discussed in FIGS. 1-5 can include or host components of the computing system 600.

As shown, the computer system 600 can include one or more processors 602, main memory 606, non-volatile memory 610, a network interface device 612, video display device 618, an input/output device 620, a control device 622 (e.g., keyboard and point device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. The bus 616 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 6 for brevity. Instead, the computer system 600 is intended to illustrate a hardware device on which components illustrated or described relative to the examples of FIGS. 1-5 and any other components described in this specification can be implemented.

The computer system 600 can take any suitable physical form. For example, the computing system 600 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some embodiment, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The processor 602 can be, for example, a central processing unit, a conventional microprocessor (e.g., Intel Pentium processor). The memory (e.g., main memory 606, non-volatile memory 610, machine-readable medium 626) can be local, remote, or distributed. Although shown as single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. One skill in the relevant art will recognize that the machine-readable medium 626 can include any type of medium that is accessible by the processor. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628), which set at various times in various memory and storage devices in computing device(s). When read and executed by the processor 602, the instruction(s) cause the computing system 600 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

Software is typically stored in the non-volatile memory and/or the drive unit 624. When software is moved to the memory for execution, the processor 602 will typically make use of hardware registers to store values associated with the software and local cache that ideally serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 612 enables the computing system 600 to mediate data in a network 614 with an entity that is external to the computing system 600 through any communication protocol supported by the computing system 600 and the external entity. Examples of the network interface device 612 includes a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 612 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, an application, and the circumstances under which the permission rights stand.

Examples of the I/O devices 620 include a keyboard, a mouse or other pointing device, disk drives, printers, a scanner, and other input and/or output devices, including a display device. Examples of the display device 618 can include a cathode ray tube (CRT), liquid crystal display (LCD), or any display device.

In operation, the computer system 600 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. At least one computer-readable storage medium excluding transitory signals and storing instructions for execution by at least one processor, wherein execution of the instructions causes a system to:
   receive, from an authentication system and at a visual voicemail server, a request for the visual voicemail server to generate a visual voicemail message that includes authentication information usable to authenticate a network entity,
      wherein the network entity includes a wireless device of a wireless network, a user of the wireless device, or an application of the wireless device;
   in response to receiving the request for the visual voicemail server to generate the visual voicemail message, generate, by the visual voicemail server, the visual voicemail message that includes the authentication information;
   send the visual voicemail message to the wireless device;
   request, from the wireless device, the authentication information included with the visual voicemail message;
   receive, from the wireless device, the authentication information included with the visual voicemail message; and
   in response to receiving the authentication information, authenticate the network entity.

2. The at least one computer-readable storage medium of claim 1, wherein authenticating the network entity enables the wireless device to participate in a restricted activity, access restricted content, or access a restricted service on the wireless network.

3. The at least one computer-readable storage medium of claim 1, wherein the network entity belongs to a group of two or more network entities, and wherein execution of the instructions further causes the system to:
   authenticate each network entity in the group in response to receiving, from the wireless device, the authentication information.

4. The at least one computer-readable storage medium of claim 1, wherein the network entity belongs to a group of two or more network entities, and wherein execution of the instructions further causes the system to:
   generate an additional visual voicemail message for each network entity of the group of network entities; and
   send, over the wireless network, the respective visual voicemail messages to the respective network entities of the group of network entities,
      wherein the visual voicemail messages have common authentication information in multiple formats including an audio format and a textual format.

5. The at least one computer-readable storage medium of claim 1, wherein the network entity belongs to a group of two or more network entities, and wherein execution of the instructions further causes the system to:
generate an additional visual voicemail message for each network entity of the group of network entities; and
send, over the wireless network, the respective visual voicemail messages to the respective network entities of the group of network entities,
wherein the additional visual voicemail messages include additional authentication information usable to authenticate the group of network entities, the authentication information including an audio message, a transcription of the audio message, an image, or contact information.

6. The at least one computer-readable storage medium of claim 1, wherein the authentication information is received in an audio format or a textual format.

7. The at least one computer-readable storage medium of claim 1, wherein the wireless device is one of: a smartphone, a vehicle communications system, or a smart appliance that is communicatively coupled to the wireless network.

8. The at least one computer-readable storage medium of claim 1, wherein the authentication information includes any of an audio message, a telephone number, a contact name, an image, a date, a time and a duration of the audio message, or a transcript of the visual voicemail message.

9. The at least one computer-readable storage medium of claim 1, wherein, the wireless device transparently sends the authentication information over the wireless network irrespective of input from the user.

10. The at least one computer-readable storage medium of claim 1, wherein the execution of the instructions further causes the system to:
determine a particular format in which to receive the authentication information; and
receive, from the wireless device, the authentication information in the particular format,
wherein the network entity is not authenticated if the authentication information is received from the wireless device in a format different from the particular format.

11. A system comprising:
a visual voicemail server configured to generate a visual voicemail message that includes authentication information usable to authenticate a network entity;
a wireless communication device communicatively coupled to the visual voicemail server, the wireless communication device comprising at least one first processor and at least one first non-transitory computer-readable storage medium storing instructions, which when executed by the at least one first processor, cause the wireless communication device to:
send an access request to participate in a restricted activity or access restricted content;
in response to sending the access request, receive, from the visual voicemail server, the visual voicemail message that includes authentication information;
access the authentication information of the visual voicemail message;
send, to an authentication system, the authentication information of the visual voicemail message; and
in response to sending the authentication information to the authentication system, participate in the restricted activity or access the restricted content; and
the authentication system communicatively coupled with the visual voicemail server and comprising at least one processor and at least one second non-transitory computer-readable storage medium storing instructions, which when executed by the at least one second processor, cause the authentication system to:
send, to the visual voicemail server, a request to generate the visual voicemail server;
receive, from the wireless device, the authentication information of the visual voicemail message; and
in response to receiving the authentication information, authenticate the wireless communication device, thereby enabling the wireless device to participate in the restricted activity or access the restricted content.

12. The system of claim 11, wherein the wireless device is one of: a smartphone, a vehicle communications system, or a smart appliance that is communicatively coupled to a wireless network.

13. The system of claim 11, wherein the authentication information includes any of an audio message, a telephone number, a contact name, an image, a date, a time and a duration of the audio message, or a transcript of the visual voicemail message.

\* \* \* \* \*